United States Patent
Herbert

(10) Patent No.: US 7,609,037 B1
(45) Date of Patent: Oct. 27, 2009

(54) "NATURAL MODULATION" FOR MAXIMIZING EFFICIENCY IN POWER CONVERTERS

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 211 days.

(21) Appl. No.: 11/767,516

(22) Filed: Jun. 24, 2007

Related U.S. Application Data

(60) Provisional application No. 60/805,715, filed on Jun. 23, 2006, provisional application No. 60/807,056, filed on Jul. 11, 2006, provisional application No. 60/807,499, filed on Jul. 16, 2006, provisional application No. 60/866,613, filed on Nov. 21, 2006, provisional application No. 60/890,539, filed on Feb. 19, 2007, provisional application No. 60/802,993, filed on Aug. 1, 2006.

(51) Int. Cl.
  G05F 1/00 (2006.01)
  G05F 1/613 (2006.01)
(52) U.S. Cl. ........................... 323/266; 323/223
(58) Field of Classification Search .......... 323/222, 323/225, 266, 268, 272, 282, 284, 223–224, 323/271
  See application file for complete search history.

(56) References Cited

U.S. PATENT DOCUMENTS

| | | | | |
|---|---|---|---|---|
| 4,672,300 A | * | 6/1987 | Harper | 323/222 |
| 5,867,379 A | * | 2/1999 | Maksimovic et al. | 323/222 |
| 5,892,352 A | * | 4/1999 | Kolar et al. | 323/213 |
| 5,903,138 A | * | 5/1999 | Hwang et al. | 323/266 |
| 6,051,961 A | * | 4/2000 | Jang et al. | 323/224 |
| 6,504,423 B2 | * | 1/2003 | Riggio et al. | 323/284 |
| 6,825,644 B2 | * | 11/2004 | Kernahan et al. | 323/283 |
| 6,979,982 B2 | * | 12/2005 | Herbert | 323/272 |
| 7,218,081 B2 | * | 5/2007 | Jang et al. | 323/222 |
| 2005/0218870 A1 | * | 10/2005 | Lys | 323/222 |

* cited by examiner

*Primary Examiner*—Adolf Berhane
*Assistant Examiner*—Jue Zhang

(57) ABSTRACT

Many power converters operate with an input voltage that has a normal range of voltage that is quite narrow, for example, commercial ac voltage or from a regulated upstream power converter. To accommodate transient and abnormal conditions, power converters are often designed for a wide range of input voltage, which seriously compromises their efficiency at nominal voltage. This invention teaches a power converter that is optimized for the normal operating voltage range. A variable dc-dc transformer and a buck derived modulator are used in series. The buck circuit is most efficient at high duty cycles, and for normal input voltage, the buck converter may be saturated at 100 percent duty cycle. The duty cycle of the buck converter is reduced to accommodate over voltage transients. Efficiency is compromised, but the duration is short, so that is acceptable. For normal and under voltage conditions, the effective turns ratio of the variable dc-dc transformer is modulated to effect control. At normal input voltage, the effective turns ratio is nearly maximized, for optimum efficiency. At lower voltages, the efficiency is compromised, but the duration is short, so that is acceptable.

11 Claims, 7 Drawing Sheets

Boost converter modulator:

Buck conveter modulator:

Variable dc-dc transformer modulator:

"NATURAL MODULATION" FOR MAXIMIZING EFFICIENCY IN POWER CONVERTERS

BACKGROUND OF THE INVENTION

This invention relates to power converters, and more particularly to high efficiency high voltage dc or ac input to low voltage dc output power converters.

Maximizing efficiency is very import in power converters. Most power systems are less efficient than they could be. Important contributors to inefficiency are: too many conversion steps, and operating at duty-cycles that have high rms current and/or voltage. Often, the latter is necessitated by specifying operation over too wide a range of input voltage.

Power converter can be optimized for the nominal operating conditions. The most efficient topology is used, provided that it must have acceptable performance during transient conditions.

Many power converters operate with a well-defined normal input voltage, either from commercial ac power or from a regulated up-stream power converter. Efficiency should be optimized for that normal voltage.

As the input voltage deviates further from normal, more compromise is acceptable. Three conditions are generally applicable, as shown in FIG. 2. Special applications may have more.

1. Normal steady-state voltage: This is a narrow band around the nominal value, probably 3 to 5 percent. Commercial ac power is quite well regulated, as are many 48 V dc systems. Efficiency is maximized for this condition.
2. Normal transient voltage: This is a much wider voltage band, and it may vary with time. The power converter must meet all performance specifications, but operation in this condition is limited in time, and it is acceptable to have degraded efficiency.
3. Abnormal transient: Operation need not meet specification, but it is preferred that 1) the power converter will recover following the transient with no damage, and 2) there will be no over-voltage output.

Special applications may require emergency modes, such as prolonged operation at reduced voltage (brown-out) or on battery backup. Many applications will require continued operation for a time following loss of power (hold-up).

A power converter is more efficient if it is designed for one input voltage. If connected to an incorrect voltage, it is preferred that it not be damaged and there is no over-voltage output, but it is probably acceptable if the power converter remains off (disabled). Some power supplies are required to work with "universal" input, usually 100 V to 240 V ac. An auto-ranting input transformer can be designed for dual or triple input voltages, allowing auto-ranging between two voltages, for example, 100V ac, 120V ac or 240 V ac, with no compromise in efficiency, as long as it is operated near the nominal voltage for each range.

REFERENCE TO RELATED PATENTS AND PATENT APPLICATIONS

The output stage for the power converters is a variable dc-dc transformer. Reference is made to U.S. patent application Ser. No. 11/423,957, filed Jun. 14, 2006 and entitled "Variable Transformer". This application is included herein by reference.

Also, reference is made to the following transformer patents and patent application:

U.S. Pat. No. 7,023,317, issued Apr. 4, 2006, and entitled "Cellular Transformers."

U.S. Pat. No. 7,119,648, issued Oct. 10, 2006, and entitled "Coaxial Push Pull Transformers for Power Converters and Like Circuits."

U.S. Pat. No. 4,665,357, issued May 12, 1987, and entitled "Flat Matrix Transformers."

These patents and this application are incorporated herein by reference.

Also, reference is made to the following pfc (power factor correction) patents and patent applications:

U.S. Pat. No. 6,115,267, issued Sep. 5, 2000, and entitled "AC-DC Converter with No Input Rectifiers and Power Factor Correction."

U.S. Pat. No. 7,139,180, issued Nov. 21, 2006, entitled "Three Phase Buck Power Converters Having Input Current Control."

These patents are incorporated herein by reference.

This application claims priority to the following patent applications:

Ser. No. 60/805,715, filed Jun. 23, 2006, and entitled "Using "Natural Voltage" to Maximize Efficiency in Power Converters."

Ser. No. 60/807,056, filed Jul. 11, 2006, and entitled Power Factor Corrected Single-Phase AC-DC Power Converter Using Natural Modulation."

Ser. No. 60/807,499, filed Jul. 16, 2006, and entitled "Power Factor Corrected Single-Phase AC-DC Buck Power Converter Ser. No. 60/820,993, filed Aug. 1, 2006, and entitled "Natural Modulation"

Ser. No. 60/866,613, filed Nov. 21, 2006, and entitled "Three-phase PFC Ac-Dc Converter having "100 Percent Duty Cycle," and Ser. No. 60/890,539, filed Feb. 19, 2007, and entitled "100% Duty-Cycle Buck-derived and 0% Duty-Cycle Boost-Derived PFC 3-Phase Ac-Dc Power Converters."

These patent applications are incorporated herein by reference.

SUMMARY OF THE INVENTION

This invention teaches the combination of a buck derived input circuit operating at high duty-cycle with a variable transformer operating at nearly its maximum effective turns ratio for the condition of the input voltage being near nominal. For over-voltage, the buck converter can reduce its duty-cycle to protect against high input voltage and regulate the inter-stage voltage to within the control range of the variable dc-dc transformer. For nominal and under-voltage, the variable dc-dc transformer modulates its effective turns ratio to control the output voltage.

This invention teaches that the natural duty cycle is defined as one that is controlled by an ideal mathematical algorithm or expressions, not by feedback. The "natural voltage" is the output voltage in that mode, and it will follow the input voltage linearly. Usually, the "natural duty-cycle" will be that which maximizes efficiency, though it may be optimized for other criteria.

An example is a dc-dc buck converter with a precise fixed 0.90 duty-cycle. The output voltage is 0.90 times the input voltage, nominally, but since it is not regulated by feedback, there are line and load regulation errors in the output voltage.

In general, the most efficient operating condition for a buck converter is the one with the highest duty-cycle. For a dc-dc buck converter, the most efficient natural duty-cycle is 100 percent (continuously on). The input passes to the output of the buck converter, so the natural output voltage Vo equals the input voltage Vi. There are no switching losses, nor core losses in the inductor. The buck converter modulates to a lower duty-cycle only during over-voltage transients.

This invention teaches several embodiments of buck converters that may be used as the input stage, as examples, not limitations.

A dc-dc buck converter.

A single-phase ac-dc pfc buck converter having a boost derived input switch going to a storage capacitor and a buck output switch. The input switch has a duty-cycle of 1 when the input voltage is less than the output voltage. The buck output switch has a duty-cycle of 1 when the input voltage is greater than the output voltage.

An embodiment of 1 where the natural output voltage equals the rms input voltage.

A three-phase ac-dc pfc buck converter having three switches to the three-phase input voltage, each phase being full-wave rectified.

A three-phase ac-dc pfc buck converter having six ac switches to the three-phase input voltage. This is a variant of one disclosed in Ser. No. 11/162,591, but using a natural duty-cycle so that its output dc voltage linearly tracks the input rms voltage.

A variant of 5, having "100 percent duty cycle".

In the power converters of this invention, the output stage is a variable dc-dc transformer. In some embodiments of the invention, the variable dc-dc transformer substitutes for the transformer of a transformer coupled buck converter, providing control as well as isolation and voltage shifting.

A "dc-dc" transformer is a high frequency transformer with a "100 per-cent" duty-cycle primary excitation and synchronous rectifiers. Dc-dc transformers are recognized as being among the most efficient power converters, but they do not provide regulation.

The effective turns-ratio of the variable dc-dc transformer is changed by electronic switching. When the transformer is operating near its maximum ratio, its efficiency is very high, nearly equal to a fixed ratio dc-dc transformer. The ratio can be modulated to control the output voltage precisely.

The variable dc-dc transformer can regulate down to a very low input voltage, but as the voltage drops, the input current increases. It can handle transient low voltage conditions very well, but not prolonged low input voltage operation (unless ruggedized). It cannot regulate voltage above its maximum ratio, so an input stage must be used to limit the maximum voltage to the variable dc-dc transformer's input, if over-voltage is anticipated.

For more information, please see U.S. patent application Ser. No. 11/423,957, filed Jun. 14, 2006 and entitled "Variable Transformer". This application is included herein by reference.

Please also see U.S. Pat. No. 4,665,357, issued May 12, 1987, and entitled "Flat Matrix Transformers."

This patents is incorporated herein by reference.

Please also see A Seminar Presented at the Fifth International High Frequency Power Conversion Conference '90 Santa Clara, Calif., May 11, 1990: Tutorial: "Design and Application of Matrix Transformers and Symmetrical Converters." This tutorial is incorporated herein by reference.

A buck converter can handle over-voltage well, by reducing its duty-cycle. Once the duty-cycle reaches 100 percent, it cannot regulate a lower voltage input.

This makes an ideal pairing with the variable dc-dc converter. The buck converter input can operate normally at maximum duty cycle, but limit any over-voltage condition. At nominal and lower input voltages, the variable dc-dc transformer provides the regulation.

Accordingly, all that is required to handle the full range of input voltages is a slight overlap of the control regions of the buck converter and the variable dc-dc transformer. Both stages will be operating at their most efficient operating mode. Preferably, the transition is just above the normal input voltage, so that the buck converter is always saturated, as shown in FIG. 5.

A single phase pfc ac buck converter cannot be continuously on, but its efficiency can be maximized by operating at its highest duty-cycle. For over-voltage, the duty-cycle is reduced to limit the output voltage. For normal and under-voltage conditions, the output voltage to tracks the rms input voltage linearly.

A three-phase ac input is equivalent to a dc input, if energy transfer is considered. The three-phase ac buck converter has a natural output voltage at the maximum duty-cycle that is a dc voltage equal to $3 Vi/\sqrt{2}$, where Vi is the rms input voltage, phase to neutral. While the duty-cycle of the switches cannot be 100 percent, the duty-cycle of the inductor current can be. The net voltage across the inductor is very low, which minimizes core losses.

An embodiment of a three-phase ac buck converter allows the phase with the highest voltage magnitude to be on continuously, and one or the other of the other two phases is always on. The natural voltage of such a buck converter has a ripple component that can be compensated in the variable transformer second stage to produce a dc output voltage.

The single-phase ac buck converter is more complicated, as energy storage is required. Its natural output voltage at maximum duty-cycle equals Vi, where Vi is the rms input voltage.

A voltage measurement method using a 45 degree lead circuit, a 45 degree lag circuit, taking the square of each and summing it. The precise algorithm requires taking the square root of the sum, but that is not necessary as the output is approximately linear over a small range.

All of the ac-dc circuits are reciprocal and can be used as dc-ac converters with appropriate engineering modifications to accommodate the reversed current flow.

DETAILED DESCRIPTION

The theory of operation for the dc-dc natural modulation buck power converter is almost trivial, but the discussion provides a background for the other embodiments of the invention to be discussed later.

Figure 1:
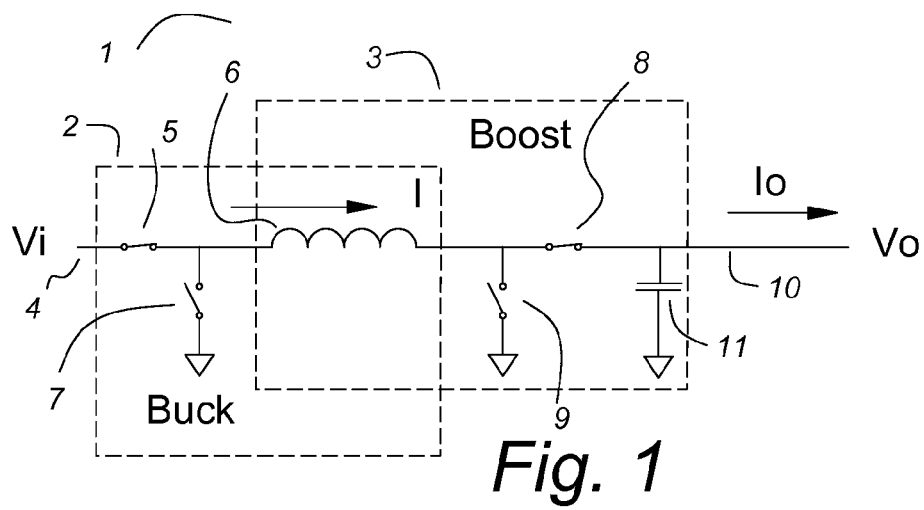
FIG. 1 shows a power converter of this invention having a buck input stage and a boost output stage.

FIG. 1 shows a power converter 1 having a dc-dc buck converter 2 as the input stage of the power converter 1, and a boost converter 3 as the output stage.

An input voltage Vi is applied to an input 4 of the dc-dc buck converter 2. A first switch 5 may be pulse width modulated to control a voltage Vo on the output 10 of the power converter 1, as would be well known to one skilled in the art of power converters. Because the current I through an inductor 6 cannot be interrupted, whenever the first switch 5 is open, a second switch 7 is closed.

The power converter 1 has a second mode of operation in which the first switch 5 is kept closed and the second stage boost converter 3 is active. A boost switch 9 may be closed to increase the current I in the inductor 6, then opened to direct the current I through a boost rectifier switch 8 to an output capacitor 11. The operation of boost converters is well known to one skilled in the art of power converters.

In the figures, like reference designators indicate the same part. Many of the drawings are simplified schematics, showing only the parts necessary to explain the points of novelty sufficiently so that one skilled in the art of power converters can use the invention without undue experimentation. Many parts necessary for practical power converters are not shown, such as input filters, feedback amplifiers and controls, snubbers, MOSFET switches, rectifiers, monitoring and error detection circuits, voltage references and so forth, as illustrations, not limitations. One skilled in the art of power converters would know how to design and use these parts to make a practical power converter.

Figure 2:
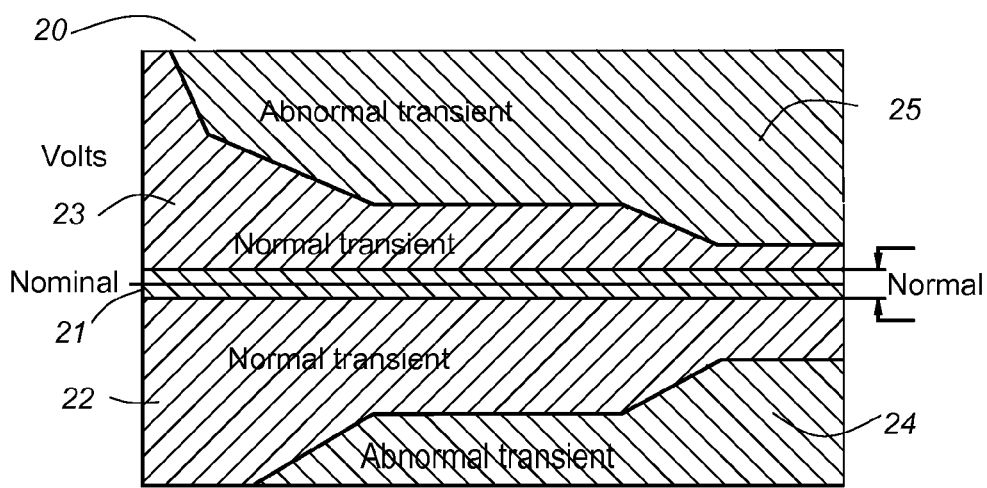
FIG. 2 shows normal, normal transient and abnormal transient line voltage conditions.

FIG. 2 shows a graph 20 of representative voltage transient conditions for the input voltage of a power converter with respect to time, the vertical axis representing the magnitude of an input voltage transient and the horizontal axis representing the length of time that the transient of that magnitude may persist. The "Normal" voltage 21 is a narrow band around the nominal, typically plus or minus three percent, as an example, not a limitation. A power converter will operate most of the time at this condition, and it is reasonable to optimize the power converter for this voltage band.

It is a fact of life that there are anomalies in the input voltage, and the power converter must continue operating properly when they occur if they are not extreme. In the graph 20, these are depicted as the "Normal transient" regions 22 and 23. Above and beyond these regions are regions 24 and 25, depicted as "Abnormal Transient." These are extreme conditions, and the power converter may not operate properly, but it is reasonable to require that it not be damaged and that it not output an over-voltage, which could damage the load.

In as much as the power converter will almost always be operating very near the nominal input voltage, this invention teaches that it is preferred to optimize performance, and in particular, the efficiency, at that voltage. As the voltage deviates from its nominal value, it is acceptable for the efficiency to be less. The power converter may have to be ruggedized if it must be able to operate for prolonged periods in such a condition, as, for example, not a limitation, by having larger heat sinks and/or more cooling.

In a dc-dc converter of this invention, the buck input stage is on continuously for any input voltage that is in the normal range and below. It only modulates for over-voltage conditions. The input voltage passes through to the boost stage unmodified. In the example of FIG. 1, that is because the first switch 5 is closed and remains closed.

Figure 3:
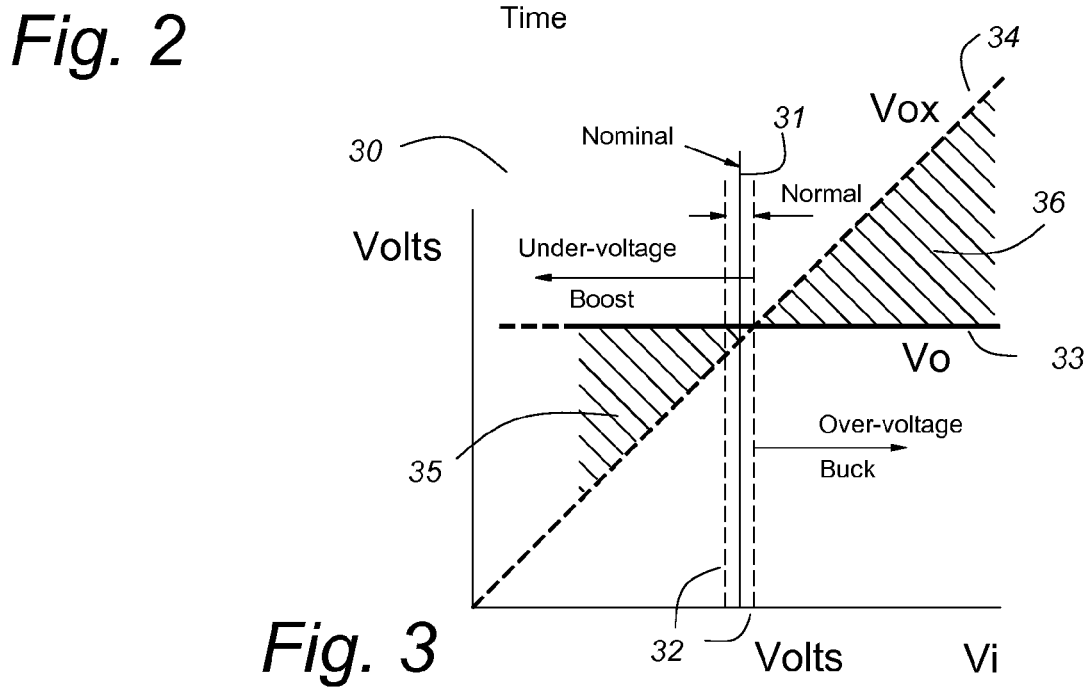
FIG. 3 is a graph showing the operation and output voltage of the power converter of FIG. 1 for various input voltages.

When the input voltage is in the normal range or below (under-voltage), the boost stage regulates the output voltage by feedback of the output voltage, which modulates its duty cycle, as would be well known by one skilled in the art of power converters. If there is an over-voltage condition on the input, the buck regulator switches to limit the output voltage. Both stages operate at nearly their maximum efficiency when the input voltage is in the normal range. This is shown in the graph 30 of FIG. 3. The vertical axis is the voltage at the various nodes as indicated by the curves. The horizontal axis represents the input voltage Vi of the power converter, which may be, as an example, not a limitation, the power converter 1 of FIG. 1.

The vertical lines 32, 32 indicate a region 31 wherein the input voltage Vi is within its normal range, as defined in the discussion of FIG. 2, above. A first curve 33 shows the output voltage Vo, with reference to FIG. 1, when the power converter 1 is regulating normally.

A second curve 34 is a hypothetical voltage Vox, thus dashed, and shows what the output voltage would be in the absence of any regulation. It is equal to the input voltage Vi.

If the input voltage Vi is greater than its normal value, it is an over-voltage condition, and the dc-dc buck converter 2 is pulse width modulated to regulate the output voltage Vo, as shown by the flat region of the curve 33, Vo. This is shown by a first hatched region 36.

At lower input voltages, the output voltage Vo is regulated by the boost converter 2. The duty cycle of the boost switch 9 is varied under feedback control to regulate the output voltage Vo. This is shown by a second hatched region 35.

Thus the output voltage Vo is regulated for any input voltage over a wide range. The efficiency of the power converter 1 is optimized, because in the normal range, the buck converter 2 is operated at its most efficient state, with its duty cycle equal 100 percent. The boost converter 3 is also operating at a very efficient state, with its duty cycle near zero percent.

Figure 4:
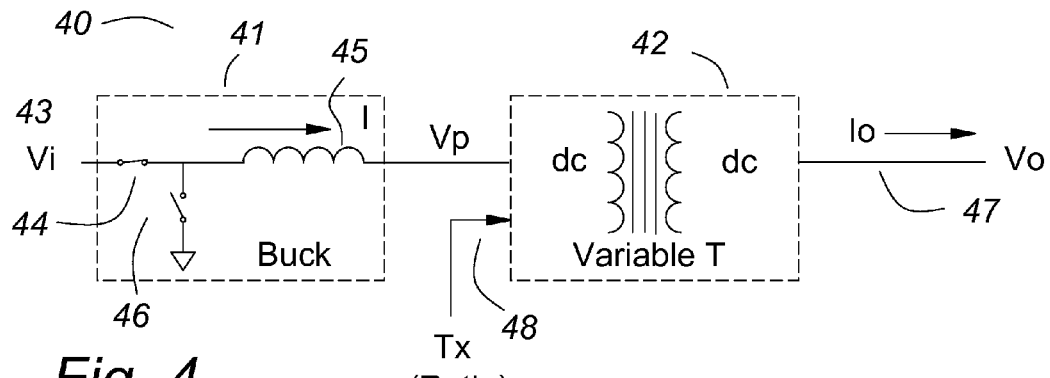
FIG. 4 shows a power converter of this invention having a buck input stage and a variable dc-dc transformer output stage.

FIG. 4 shows a power converter 40 of this invention. A dc-dc buck converter 41 is the input stage of the power converter 40, and a variable dc-dc transformer 42 is the output stage.

A dc-dc transformer is defined as a circuit for receiving a dc input voltage and producing a dc output voltage. Usually, the circuit has a primary switching circuit, typically MOSFETs with an appropriate drive circuit to excite the primary of a high frequency transformer with a square wave excitation. It may be a push-pull primary, a half-bridge primary, a full-bridge primary or any other suitable primary. The secondary circuit of the transformer is then full-wave rectified, usually with a push pull circuit and synchronous rectifiers. The dc-dc transformer provides dielectric isolation, though in some applications the input and output may have a common return. A dc-dc transformer usually as a fixed turns ration that determines the ratio of the input voltage to the output voltage.

The variable dc-dc transformer is as the above described dc-dc transformer, but with provisions to vary the effective turns ratio of the transformer by electronic switching.

An input voltage Vi is applied to an input 43 of the dc-dc buck converter 41. A first switch 44 may be pulse width modulated to control a voltage Vp on the output 48 of the dc-dc buck converter 2, as would be well known to one skilled in the art of power converters. Because the current I through an inductor 45 cannot be interrupted, whenever the first switch 44 is open, a second switch 46 is closed.

The output 48 of the dc-dc buck converter 1 is the power input of the variable dc-dc transformer 42. A control input 49 varies the effective turns ration of the variable dc-dc transformer 42, as explained further below. The control signal Tx on the control input 49 may be a feedback function of an output voltage Vo on an output 47 of the variable dc-dc transformer 2 so as to regulate the output voltage Vo.

In a dc-dc converter of this invention, the buck input stage is on continuously for any input voltage that is in the normal range and below. It only modulates for over-voltage conditions. The input voltage passes through to the variable dc-dc transformer unmodified, Vp=Vi.

When the input voltage is in the normal range or below (under-voltage), the variable transformer regulates the output voltage by feedback of the output voltage, which modulates its ratio. If there is an over-voltage condition on the input, the variable dc-dc transformer 42 saturates at its maximum effective turns ratio, and the buck input stage 41 switches to limit the voltage to the variable dc-dc transformer 42. Both are at maximum efficiency. This is shown in the graph 60 of FIG. 5. The vertical axis is the voltage at the various nodes as indicated by the curves. The horizontal axis represents the input voltage Vi of the power converter, which may be, as an example, not a limitation, the power converter 40 of FIG. 4.

The vertical lines indicate a region 61 wherein the input voltage Vi is within its normal range, as defined in the discussion of FIG. 2, above. A first curve 62 shows the voltage Vp, with reference to FIG. 4, when the power converter 40 is regulating normally. For lower voltages, Vp equals Vi, and for higher voltages, Vp is constant, regulated by the dc-dc buck converter 41.

A second curve 63 shows the output voltage Vo, which is constant, being regulated by the power converter 40. A third curve 64 is a hypothetical voltage Vox, thus dashed, and shows what the output voltage would be in the absence of any regulation. It is proportional to the input voltage Vi, and the proportionality is the maximum effective turns ratio of the variable dc-dc converter 42.

If the input voltage Vi is greater than its normal value, it is an over-voltage condition, and the dc-dc buck converter 41 is pulse width modulated to regulate the output voltage Vo, as shown by the flat region of the curve 62, Vp. This is shown by a first hatched region 65.

At lower input voltages, the output voltage Vo is regulated by varying the effective turns ratio of the variable dc-dc converter 41 using its control input 49. The variable dc-dc transformer 42 has boost characteristics, in that as the control Tx is reduced, the output voltage Vo is increased relative to its input voltage Vp. Thus, as the voltage on Vp droops below the normal input voltage, decreasing Tx can regulate the output voltage Vo. Tx controls the effective turns ratio, as will be explained below. This is shown by a second hatched region 66.

Figure 6:
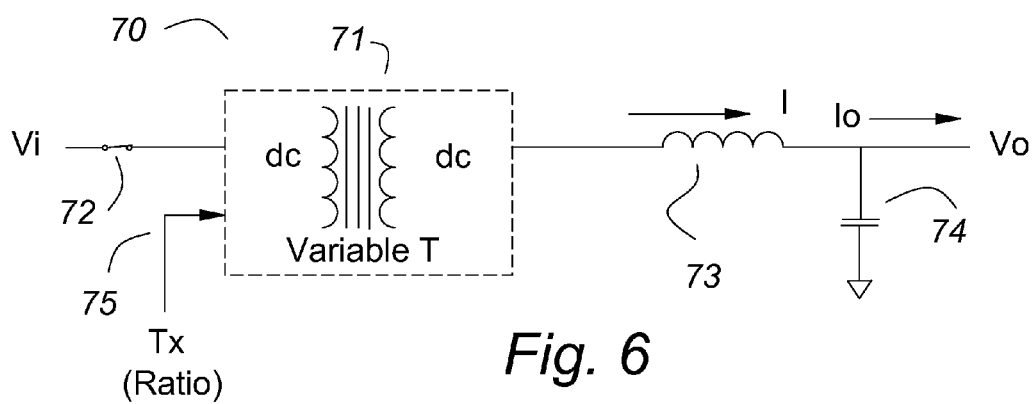
FIG. 6 shows an alternative embodiment of the invention in which a variable dc-dc transformer is integrated into a buck converter.

FIG. 6 shows a power converter 70 of this invention. In contrast to the power converter 40 of FIG. 4, a variable dc-dc transformer 71 is located between a first switch 72 and an inductor 73. An output capacitor 74 in combination with the inductor 73 provides a smooth dc output voltage Vo. The variable dc-dc transformer 71 has a control input 75. A control signal Tx controls the effective turns ratio of the variable dc-dc transformer 71 as explained further below.

Note that neither the hatched region 66 nor the Vo curve 63 extends to zero input voltage Vi. This is because, as the input voltage drops, and effective turns ratio is decreased to maintain regulation of the output voltage Vo, the input current increases (for constant load). At some point the input current becomes too great for continued operation, even for a short term transient condition.

Figure 5:
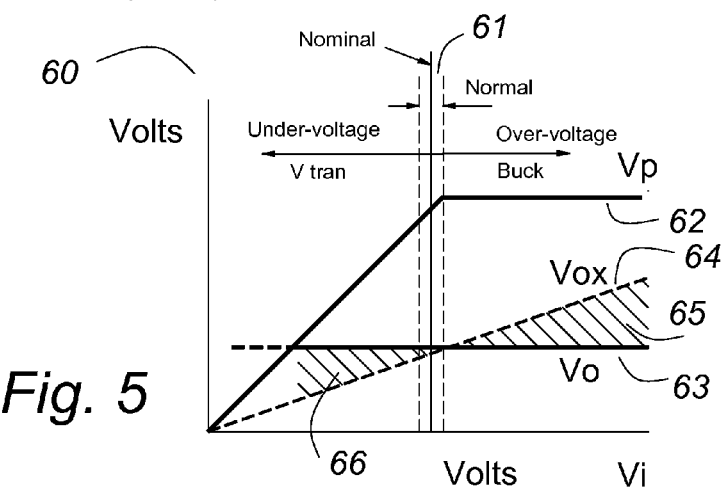
FIG. 5 is a graph showing the operation and output voltage of the power converter of FIG. 4 for various input voltages.

With reference to FIGS. 2 and 5, when the input voltage Vi is above normal, the control signal Tx is saturated at its maximum value, and the Variable dc-dc transformer 71 has the characteristics of a fixed ratio dc-dc transformer. The output voltage Vo is controlled by pulse width modulating the first switch 72. One skilled in the art will recognize the circuit as the familiar transformer coupled buck converter, except that its duty cycle is saturated at 100 percent for normal and under voltage conditions and it only operates to control during over voltage conditions. A catch rectifier is not needed, as the rectifiers on the output of the variable dc-dc transformer 71 provide that function.

When the input voltage Vi is in its normal range or is under voltage, the first switch 72 is closed continuously and has no control function. The output voltage Vo is controlled by varying the control input 75 of the variable dc-dc transformer 71.

FIGS. 7 through 10 show representative buck derived modulators, which may be used as power converter input stages. As examples, not limitations, any of them can be used with a variable dc-dc transformer second stage to make a power converter of this invention. In all cases, the preferred embodiment of the invention is that the buck converter input stage operates at its maximum duty-cycle so that its efficiency is maximized. For normal and under-voltage conditions, the maximum duty-cycle is fixed, defined by an algorithm, and the output voltage of the buck converter is not regulated and will vary proportionately as the input voltage. For over-voltage conditions of the input voltage, the duty-cycle is reduced under feedback control, to regulate the output voltage. Efficiency will be less, but the objective is to maximize the efficiency at the normal input voltage, as the power converter will operate at that condition most of the time.

Figure 7:
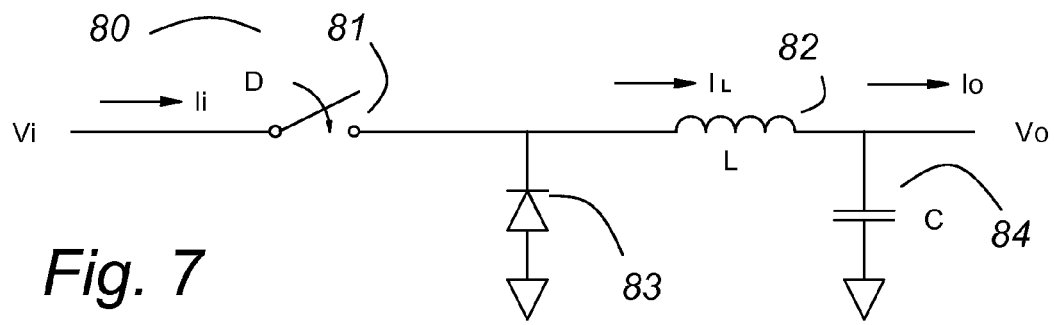
FIG. 7 shows a simple dc-dc buck converter.

FIG. 7 is a familiar dc-dc buck converter 80. It is a very common circuit, and its design and control would be well understood by one skilled in the art of power converters. A first switch 81 may be pulse width modulated so that an average voltage equal to D times Vi is applied to an inductor 82. D is the duty-cycle and Vi is the input voltage. A catch diode 83 conducts a current IL when the first switch 81 is open. An output filter capacitor 84, in combination with the inductor 82, provides a dc voltage Vo on the output.

In a power converter of the present invention, the first switch 81 would be on continuously (D=1 or 100%) for normal and under-voltage conditions of the input voltage Vi and would pulse width modulate to regulate the output voltage for over-voltage conditions.

Figure 8:
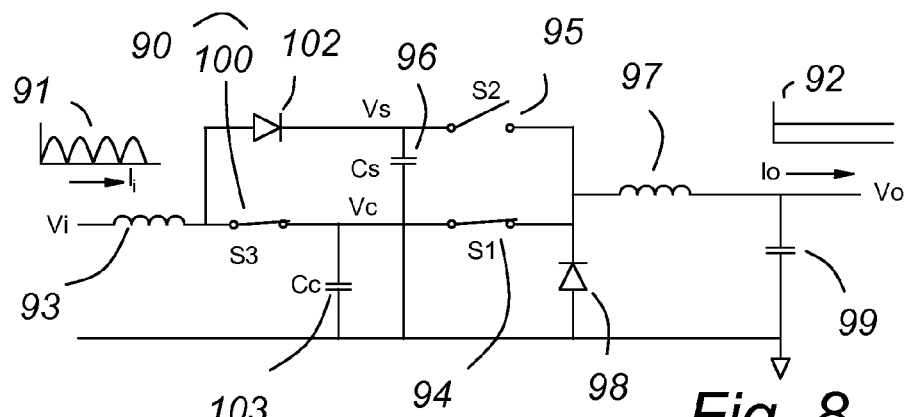
FIG. 8 shows a buck derived single phase power factor corrected (pfc) ac-dc buck converter.

FIG. 8 shows a proprietary single phase power factor correction (pfc) circuit 90. The details of this circuit are not a point of novelty in this invention, and it is shown for its characteristics as a buck derived converter and as an input stage for a power converter of this invention and as one of many possible embodiments of a buck input circuit.

In a single phase pfc circuit, the input power does not equal the output power instantaneously, though they must be equal on average over time. Therefore, energy storage must be incorporated, and, in the pfc circuit 90 of FIG. 8, that is a storage capacitor 96. To describe the buck circuits first, first and second switches 94 and 95 are pulse width modulated, mutually exclusively, to provide an average voltage equal to the output voltage Vo to the input of a second inductor 97. An output filter capacitor 99, in combination with the second inductor 97, provides a low ripple dc voltage Vo at the output.

The input voltage Vi is a full wave ac, as shown by the small graph 91. The output voltage Vo is dc, as shown by the small graph 92. When the input voltage Vi is instantaneously below the output voltage Vo, the first switch 94 is on until the input current is correct, then the second switch 95 is on until the average voltage on the inductor 97 is correct, then both switches are off and a catch diode 98 conducts until the next pwm cycle.

When the input voltage Vi is instantaneously above the output voltage Vo, the first switch 94 is on continuously and the second switch 95 is off. A third switch 100 is pulse width modulated so that the correct average voltage is applied to the second inductor 97. When the third switch 100 is open, a boost rectifier 102 conducts current from a first inductor 93 to the storage capacitor 96. Because the input current Ii and the output current Io are not instantaneously equal, they cannot be directly connected, so a small capacitor 103 is used to store the instantaneous difference current as charge.

Figure 9:
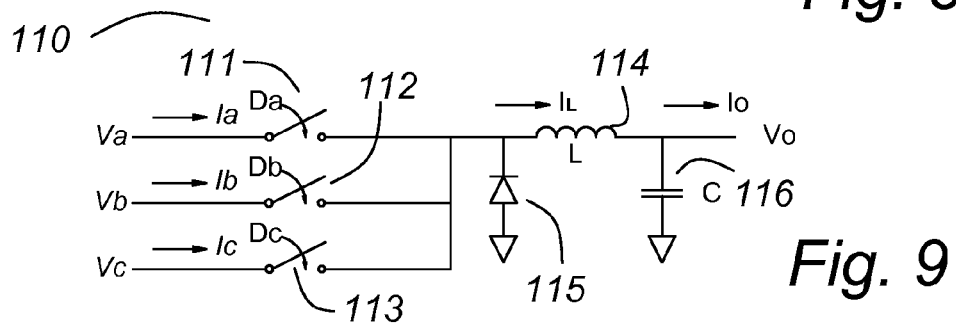
FIG. 9 shows a three-input buck converter.

FIG. 9 shows a three input buck converter 110. A multiple input buck converter may have any number of inputs greater than 1. When a "three input buck converter" is recited in the specification and the claims, multiple input buck converters with any number of input greater than one are included by definition.

There are three input voltages, Va, Vb and Vc connected, respectively, through first, second and third switches 111, 112 and 113. The closure of the first, second and third switches 111, 112 and 113 is mutually exclusive, and the average voltage on the input of an inductor 114 is Da Va+Db Vb+Dc Vb, where Da, Db and Dc are, respectively, the duty-cycles of the first, second and third switches 111, 112 and 113. When all of the first, second and third switches 111, 112 and 113 are open, the inductor current IL is conducted by a catch diode 115. An output capacitor 116, in combination with the inductor 114 provides a dc output voltage Vo.

The input voltages Va, Vb and Vc may be the full wave rectified voltages of a three phase ac input, as an example, not a limitation. In the preferred embodiment of the present invention, the duty cycles Da, Db and Dc would be determined by algorithm, maximized for optimum efficiency when the ac voltage magnitude is normal or below normal. The duty cycles Da, Db and Dc are reduced in proportion to regulate the output voltage for over voltage conditions.

Figure 10:
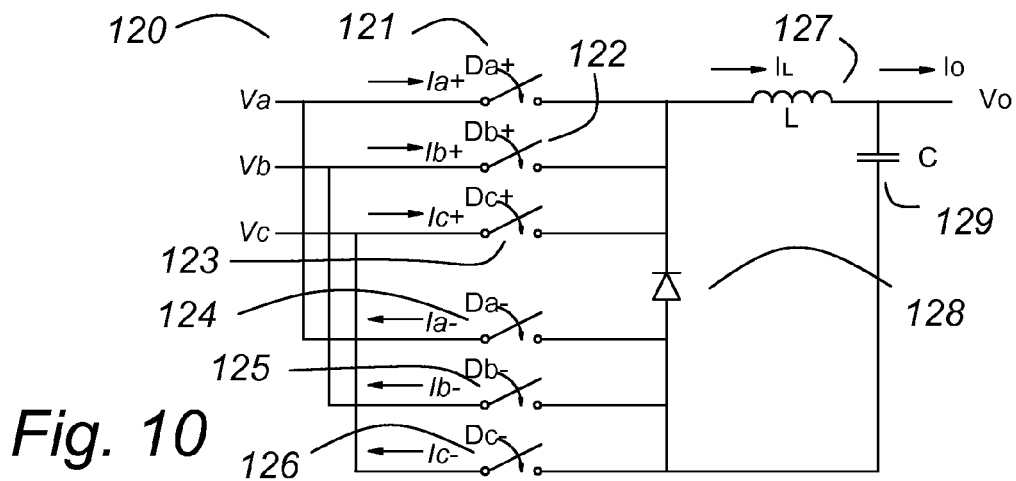
FIG. 10 shows a buck derived three-phase pfc ac-dc buck converter.

FIG. 10 shows a three phase ac to dc buck converter 120. With an appropriate algorithm for the duty cycles of the switches, it may be a pfc three phase ac to dc buck converter. The three phase ac to dc buck converter with pfc is not a point of novelty of the present invention, it is shown as an example of a buck derived input stage for the power converter of the present invention. Six ac switches 121 through 126 are connected to the three phase ac input Va, Vb and Vc. One ac switch, 121, 122 or 123 may be on when its respective phase voltage Va, Vb or Vc is positive, and one ac switch 124, 125 or 126 may be on when its respective phase voltage Va, Vb or Vc is negative.

For the preferred embodiment of the invention, one of the ac switches 121, 122 and 123 and one of the ac switches 124, 125 or 126 are on at every instant of time, if the three phase ac voltage is at or below its normal voltage. For an over voltage condition, the duty cycles are reduced proportionately, to regulate the output voltage. An inductor 127 and an output filter capacitor 129 cooperate to provide a dc output voltage Vo. A catch rectifier 128 conducts the current IL of the inductor 127 if the circuit is otherwise open.

In the buck derived modulators of FIGS. 7 through 10, the circuits may be used without their output inductors and filer capacitors as buck switching circuits, Buck switching circuits are useful as the input circuits for transformer coupled buck converters. For this invention, variable dc-dc transformer coupled buck converters are of particular interest. The buck converter 80 of FIG. 7, without the inductor 82 and the output capacitor 84 is a "dc switching circuit". The switches may be MOSFETs or other solid state switches in a practical circuit, as would be well known to one skilled in the art of power converters. The ac-dc buck converter of FIG. 8 without the inductor 97 and the output capacitor 99 is an example of a "single phase ac-dc switching circuit." The three input buck converter of FIG. 9 without the inductor 114 and the output capacitor 116 is an example of a "three input switching circuit". A multi-input buck converter can have any number of inputs greater than two, and any number of inputs is included in the definition of a "three input buck converter" or a "three input switching circuit." The three phase ac-dc buck converter 120 of FIG. 10 without the inductor 127 and the output capacitor 129 is a "three phase ac-dc switching circuit."

Figure 11:
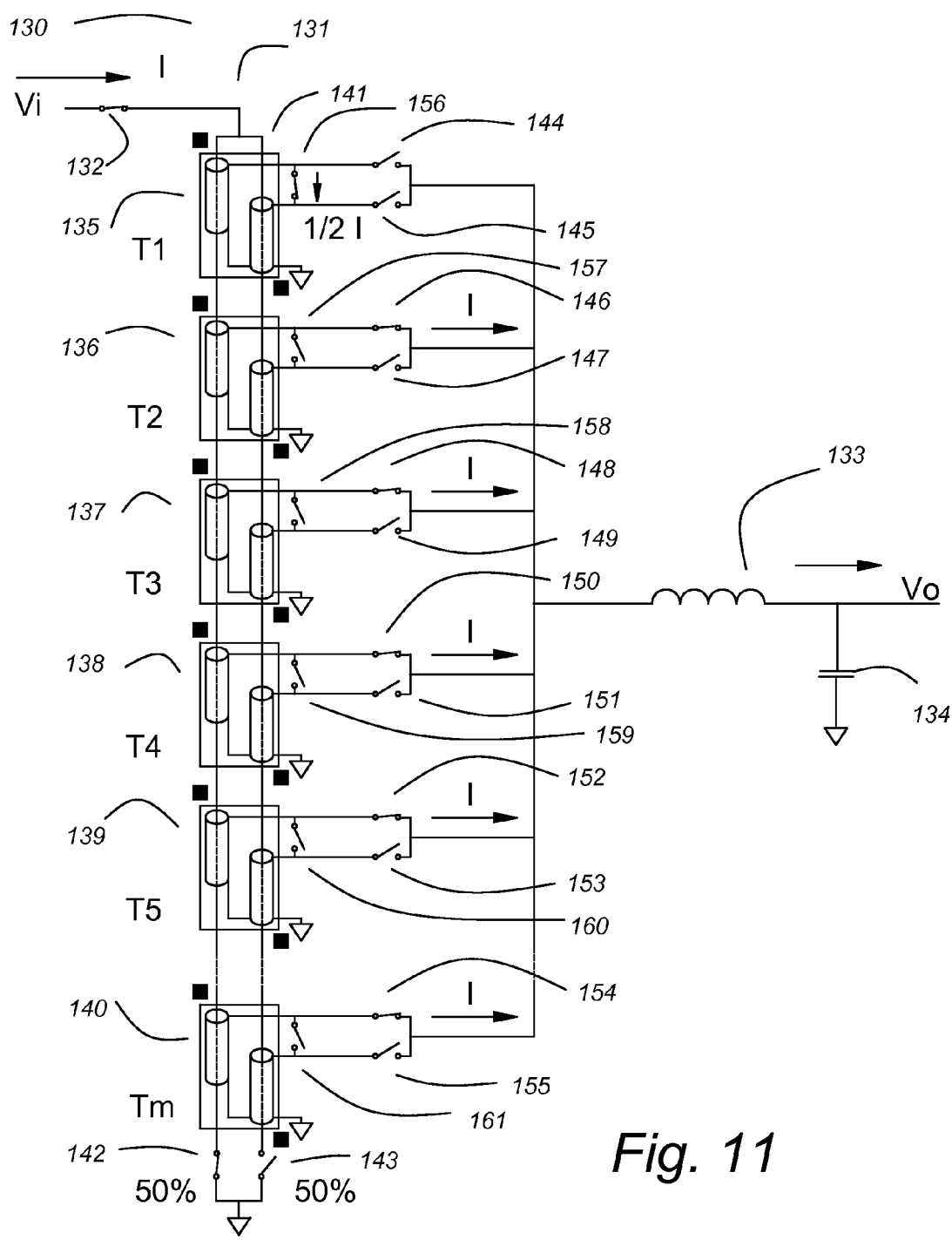
FIG. 11 shows a power converter of this invention using a variable dc-dc converter.

FIG. 11 shows a dc to dc power converter 130 of this invention. The power converter 130 comprises a dc-dc buck converter and a variable dc-dc transformer 131.

The dc-dc buck converter has a first switch 132 and an inductor 133. The variable dc-dc transformer 131 is between the first switch 132 and the inductor 133, in many respects similar to a transformer coupled buck converter, as would be well understood by one skilled in the art of power converters. For normal and under voltage conditions, the first switch 132 remains closed, or 100 percent duty cycle, for maximum efficiency. For over voltage conditions, the variable dc-dc transformer 131 is saturated at its maximum effective turns ratio, and so functions as a fixed ratio dc-dc transformer. Varying the duty cycle of the first switch 132 controls the output voltage Vo.

For normal and under voltage conditions, the input voltage Vi is connected through the closed first switch 132 to a primary winding 141 of the variable dc-dc transformer 131. First and second primary switches 142 and 143 switch alternately at fifty percent duty cycle to provide a continuous excitation of alternating voltage to the primary winding 141. As an example, not a limitation, the variable dc-dc transformer 131 has six transformer elements 135 through 140. As a generality, a variable dc-dc transformer may have any number of elements greater than one.

Each of the elements 135 through 140 has two full wave synchronous rectifiers 144 through 155. For non-variable operation, the twelve synchronous rectifiers 144 through 155 are operated alternately, synchronous to the switching of the first and second primary switches 142 and 143 so as to provide a full wave rectified output voltage Vo. One skilled in the art of power converters would know how to design and use synchronous rectifiers with transformer elements to provide a dc output voltage. An output filter capacitor 134 smoothes the output voltage Vo.

For non-variable operation, the variable dc-dc transformer 131 operates as a fixed ratio dc-dc transformer. For a power converter of the present invention, the variable dc-dc transformer 131 operates in the non-variable mode when the input voltage is over voltage and the buck input first switch 132 is pulse width modulated (pwm) to regulate the output voltage. For the example of a single turn primary winding, as shown, the turns ratio of the variable dc-dc transformer in the non-variable mode is the number of elements n to 1, six to one in the present example.

To regulate the output voltage in the normal range of the input voltage and for under voltage, the variable dc-dc transformer 131 is operated in the variable mode. Reference is made to FIG. 5 to define the voltage ranges with respect to the mode of operation. In a practical circuit, there may be some randomness in the point of mode change, either due to component variation or by design, with respect to the actual nominal voltage. Such randomness is acknowledged and accommodated in the definitions of normal voltage, under voltage and over voltage, the point being that the mode does change for higher and lower voltages operation. For this specification and the claims, "Normal voltage" and "under voltage" is the voltage range where modulation of the variable dc-dc transformer 131 controls the output voltage, and "over voltage" is the voltage range where the buck converter first switch 132 controls the output voltage irrespective of any other consideration of what constitutes normal voltage, over voltage or under voltage. In some designs, there may be an overlap where either mode of control may be used. In other designs, there may be a gap where neither mode can control the output voltage precisely, control kicking in only for more extreme voltage excursions.

In the variable mode, the ratio of the variable dc-dc transformer 131 is changed by effectively "removing" one or more of the elements 135 through 140. An element is "removed" by short-circuiting its excitation and opening its output, so it is as if it were not in the circuit. As an example, in FIG. 1, the synchronous rectifiers 144 and 145 are shown both turned off, or open, so the element 135 is effectively disconnected from the output voltage Vo. Each of the elements 135 through 140 has a shorting switch 156 through 161 across its output winding. In the element 135 of FIG. 11, the shorting switch 1156 is closed, effectively short-circuiting the excitation of the element 135 and effectively "removing" it from the circuit. With the element 135 effectively removed, the variable dc-dc transformer 131 now has an effective turns ratio of five to one instead of six to one.

In this manner, any whole number ratio change can be accomplished. Because the variable dc-dc transformer can be at one ratio part of the time and another ration for part of the time, any incremental ratio can be derived by varying the time of each incremental ratio at a rate that the time constant of the output filter can smooth.

Note, as an alternative to using the first switch 132 as a buck converter modulator, the two first and second primary switches 142 and 143 may be pulse width modulated in the manner frequently used for transformer coupled buck converters. This would eliminate one switch and its drive, and it may be easier to implement, as the first and second primary switches 142 and 143 are ground referenced. In this specification and the claims, when voltage regulation of the output voltage is accomplished by varying a duty cycle control input of the buck derived power modulator is recited, this mode of operation is included by definition.

To better understand the use of the variable dc-dc transformer as a modulator or voltage control circuit, we will first review two very familiar modulator circuits, a boost converter 170 and a buck converter 180, see FIGS. 12 through 15.

Figure 12:
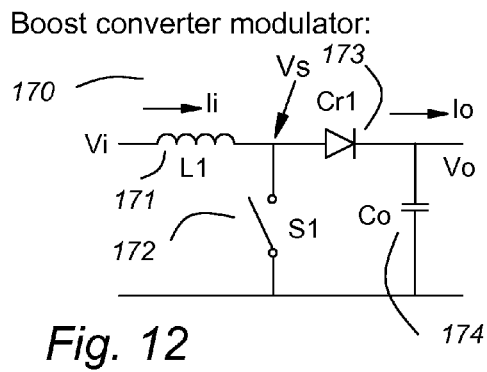
FIG. 12 shows a boost converter.
Figure 13:
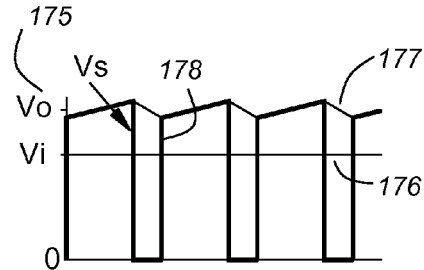
FIG. 13 shows the waveforms of the boost converter of FIG. 12.

In FIG. 12, the boost converter 170 has an input inductor 171 with an input current Ii and an input voltage Vi. A switch 172 periodically short circuits the output of the inductor 171, then opens again. When the switch 172 opens, the current Ii goes through a boost rectifier 173 to an output capacitor 174. The waveforms are shown a graph 175 in FIG. 13. A first curve 176 shows the input voltage, a second curve 178 shows the voltage Vs on the output of the inductor 171, and a third curve 177 shows the output voltage Vo. The output voltage is equal to or higher than the input voltage. It is equal only for the special case of the switch 172 remaining open (0 percent duty cycle). (Ideal components are assumed). The operation of a boost converter is well understood by one familiar with the art of power converters.

Figure 14:
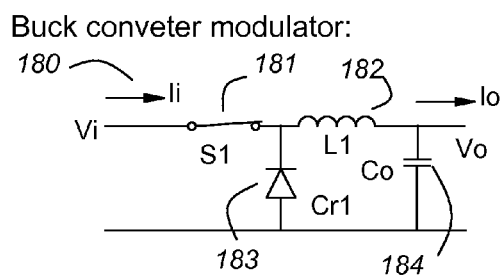
FIG. 14 shows a buck converter.
Figure 15:
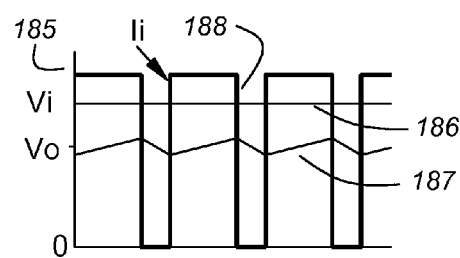
FIG. 15 shows the waveforms of the buck converter of FIG. 14.

In FIG. 14, the buck converter 180 has a switch 1181 which pulse width modulates an input voltage Vi to provide a pulsing voltage on the input of an inductor 182. When the switch 181 is open, a catch diode 183 conducts the inductor current. An output capacitor 184 in combination with the inductor 182 smoothes the output voltage Vo. FIG. 15 shows a graph 185 of the waveforms of the buck converter 180. A first curve 186 shows the input voltage Vi. A second curve 188 shows the input current Ii. A third curve 186 shows the output voltage Vo.

Figure 16:
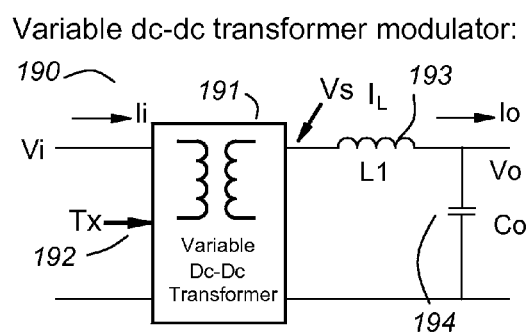
FIG. 16 shows a variable dc-dc transformer modulator.

FIG. 16 shows a variable dc dc transformer 191 configured as a variable dc-dc transformer voltage modulator 190. The variable dc-dc transformer 191 connects to an inductor 193. An output capacitor 164 in combination with the inductor 193 filters the output voltage Vo. A control input 192, designated Tx, controls the effective turns ratio of the variable dc-dc transformer 191.

The output voltage Vo on the output capacitor 164 is the voltage being regulated by the variable dc-dc transformer modulator 190, and the control Tx may be controlled by feedback of the output voltage. The input voltage Vi is reflected to the secondary of the variable dc-dc transformer 191 as its instantaneous turns ratio, and Vs will step over a small increment as the effective turns ratio is changed by Tx. Tx may be pulse width modulated between steps to produce any value of average effective turns ratio, so the average value of Vs is continuously variable. The average value of Vs determines the output voltage Vo, so the output voltage may be continuously varied. Usually, in a modulator, the output voltage is held constant by varying the modulation ratio to accommodate changes in the input voltage and load regulation.

Figure 17:
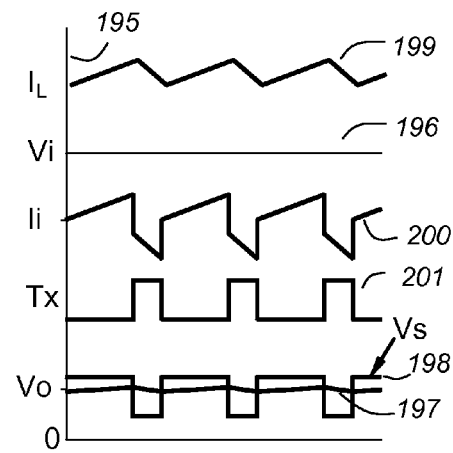
FIG. 17 shows the waveforms of the variable dc-dc transformer modulator of FIG. 16.

FIG. 17 shows a graph 195 showing the important waveforms of the modulator 190. A first curve 196 shows the input voltage Vi. A second curve 197 shows the output voltage Vo. A third graph 201 shows the control Tx and a fourth graph 198 shows the voltage Vs, the node between the inductor 193 and the variable dc-dc transformer 191.

The pulses in the curve 201 represents that Tx changes the effective ratio of the variable dc-dc transformer by one step. As an example, not a limitation, that may be from six to one changing to five to one, then back again at a fairly rapid rate, sufficiently fast so that the output ripple voltage is acceptable. The voltage Vs is the secondary voltage of the variable dc-dc transformer 191, and reflects the input voltage Vi as the instantaneous effective turns ratio. In our example, the voltage Vs will vary between $\frac{1}{6}$ times Vi and $\frac{1}{5}$ times Vi. When the reflected voltage Vs is greater than the output voltage Vo, the current through the inductor 193 will increase, raising the voltage in the output capacitor 194. The control Tx may be a hysteretic control, as an example, not a limitation, so when the output voltage Vo reaches an upper threshold, the control changes one step.

After Tx switches to a higher increment, the voltage Vs is then lower than the output voltage Vo, and the current through the inductor 193 will decrease. This is reflected to the input current Ii as a decreasing current in addition to the step current reduction due to the variable dc-dc transformer ratio change, as seen in the curve 200 of FIG. 17. The output voltage Vo equals the time average value of the voltage Vs.

Figure 18:
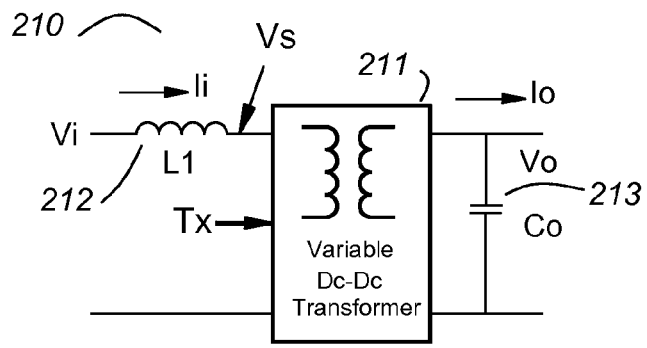
FIG. 18 shows a power converter of this invention as a reference for the waveforms that follow in FIGS. 19 and 20.

FIG. 18 shows an alternate modulator 210 in which an inductor 212 is on the input of a variable dc-dc transformer 211. An output capacitor 213 smoothes the output voltage Vo. As a control signal Tx on the control input is varied, the voltage Vs on the node between the inductor 212 and the variable dc-dc transformer 211 will reflect the output voltage Vo times the instantaneous effective turns ratio f the variable dc-dc transformer 211. If Vs is higher than the input voltage Vi, the current through the input inductor 212 is reduced. If it then steps lower, the current increases.

Figure 19:
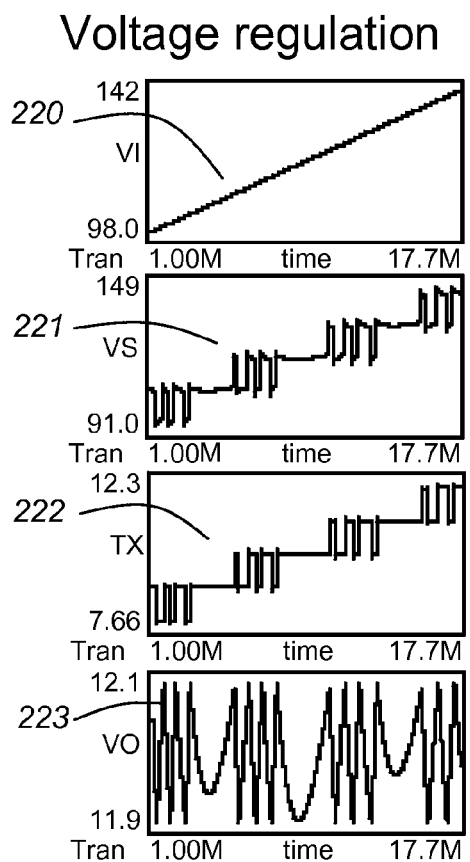
FIG. 19 shows the waveforms for the power converter of FIG. 18 with an increasing input voltage.

FIG. 19 shows four graphs 220 through 223 that are copied and pasted using the probe function of a SPICE simulation. Graph 220 shows the input voltage Vi ramping up. In response, the control signal Tx pulses and steps so that the average voltage on Vs equals the input voltage Vi, see graph 221, with excursions above and below to control the input current Ii. The resulting regulated output voltage Vo (12+/−0.1 V dc) is shown in the graph 223.

Figure 20:
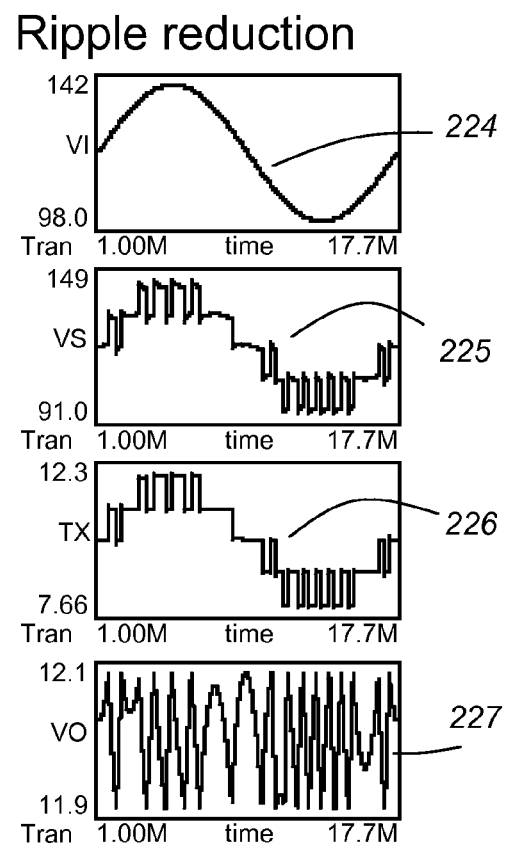
FIG. 20 shows the waveforms for the power converter of FIG. 18 with a large ac ripple voltage on its input voltage.

FIG. 20 shows four graphs 224 through 227, also copied and pasted using the probe function of a SPICE simulation. Graph 224 shows a large ripple voltage on the input voltage Vi. Graph 226 shows that the control signal Tx pulses and steps so that the average voltage on Vs equals the input voltage Vi, see graph 225, with excursions above and below to control the input current Ii. The resulting regulated output voltage Vo (12+/−0.1 V dc) is shown in the graph 227.

Figure 21:
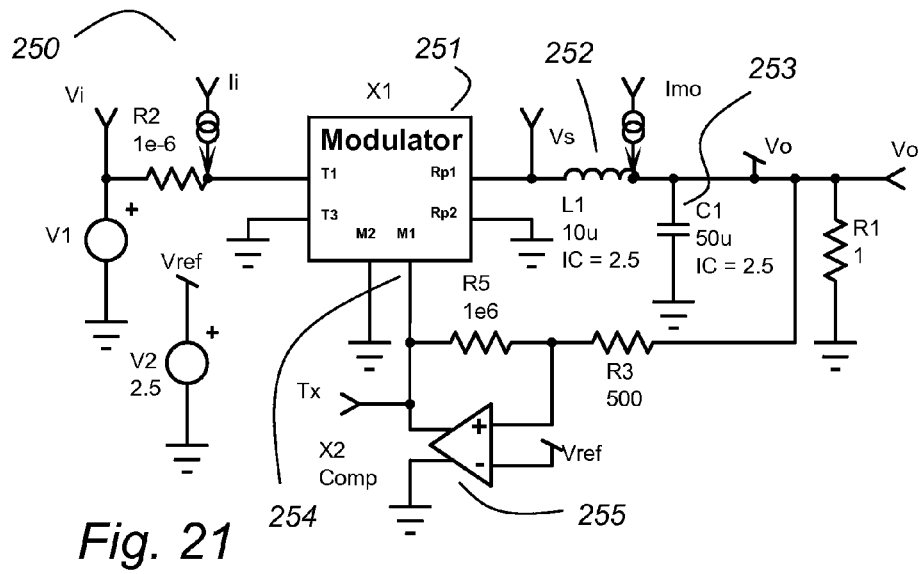
FIG. 21 shows a SPICE model of an embodiment of a power converter of this invention.

FIG. 21 shows a SPICE model 250 of a power converter of the present invention. One skilled in the art of power converters would know how to make and interpret SPICE models, so only certain key components have been specially identified with reference designators. The others, while needed for the SICE mode to run, are not points of novelty of the invention.

A "modulator" 251 is a suitable model for a variable dc-dc transformer. The input voltage Vi is taken through a negligible resistor R2. The function of R2 in the SPICE model is to provide for the current test point Ii. The output of the modulator 251 is taken to an inductor 252 and to an output capacitor 253. R1 is a simulated load.

The modulator 251 is controlled by a control input 254 having a voltage Tx. The comparator 255 is a sub-circuit and its output Tx is programmed to step between 5 and 6 V when the comparator changes state. R5 provides hysteresis.

Figure 22:
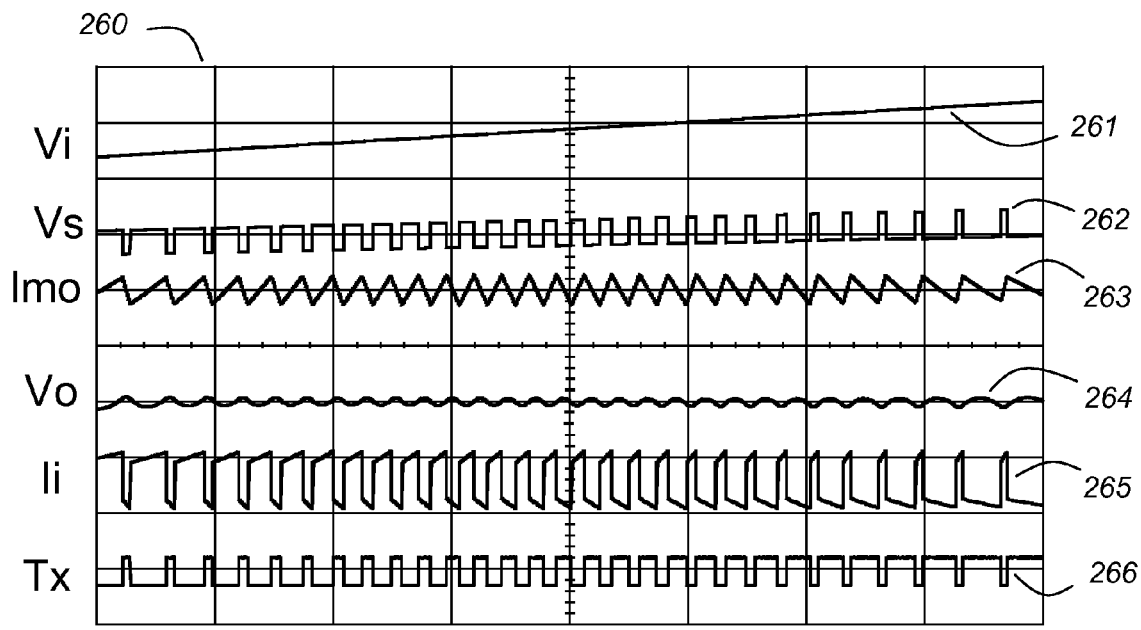
FIG. 22 shows the waveforms from the SPICE model of FIG. 21.

In the simulation, the input voltage Vi is ramped, as an example, not a limitation, between 13 and 14.5 volts, producing the graph 260 of FIG. 22. A first curve 261 shows the input voltage Vi ramping up. A second graph 266 shows the control voltage Tx stepping between 5 and 6 V, with increasing duty cycle in response to the increasing input voltage. A third graph 262 shows the voltage Vs at the output of the modulator 251 and the input of the inductor 252. At each instant it reflects the input voltage as the ratio of the modulator 251, simulating the output of a variable dc-dc transformer. Over any interval, Vs, on average, equals Vo. A fourth curve 264 shows the output voltage Vo with a slight ripple voltage due to the pulses in Vs.

A fifth curve 263 shows the current Imo in the inductor 252. One skilled in the art of power converters will recognize that it is typical of a buck converter inductor current waveform, except that the driving voltage Vs has smaller steps. Last, a curve 265 shows the input current Ii. While there are some similarities to the input current of a buck converter, the current steps are much smaller, for quieter, more efficient operation.

Note that the switching circuits described in this specification are simplified schematics, to highlight the teachings of the invention without undue clutter. One skilled in the art of power converters and like circuits would understand how to use the invention and provide other circuits and components necessary for practical circuits without undue experimentation. As illustrations, not limitations, there may be snubbers, clamps, EMI filters, power supplies and conditioning circuits, surge protection, over current protection, and so forth. There may be additional logic and measurement circuits, and control and driver integrated circuits. There may be additional digital logic or analog circuits within or associated with a circuit to meet the requirements of a particular application.

In particular, one skilled in the art of power converters would know how to implement the various driver circuits for the various switches, the primary excitation, the rectifiers and the ac switches. He would know how to implement the timing and control circuits for pulse width modulation, phasing, interleaving and so forth, and he would know how to compensate the feedback control. A commercial power converter has a number of accessory functions that are not described here as they are not at the heart of the invention, yet they must be included in the commercial power supply. One skilled in the art of power converters would know how to use this invention as taught by this specification and would know how to integrate the accessory functions, timing and controls to make a practical power converter without undue experimentation.

In this specification and the claims, a "variable dc-dc transformer" is as described in US patent application Ser. No. 11/423,957, filed Jun. 14, 2006 and entitled "Variable Transformer". Other embodiments of variable dc-dc transformers are described in U.S. Pat. No. 4,665,357, issued May 12, 1987, and entitled "Flat Matrix Transformers" and a seminar presented at the Fifth International High Frequency Power Conversion Conference '90 Santa Clara, Calif., May 11, 1990, which used a tutorial entitled "Design and Application of Matrix Transformers and Symmetrical Converters."

The preferred embodiments of the invention comprise a buck-equivalent circuit and a variable dc-dc transformer in series. In a series circuit, the order of the series components is not of consequence, fundamentally, though it will affect the detail design. In this specification and the claims, if a sequence of series components is specified, it includes all other possible sequences in series of those or equivalent components. Power converters are usually reciprocal if the necessary adjustments are made to the detail design to accommodate the reversed direction of current flow. In this specification and the claims, recitation of the components of a power converter of this invention includes its reciprocal, that is, an equivalent circuit in which the power flow is reversed, wherein an output becomes the input and vice versa.

DEFINITIONS

Power converter: noun: A power converter is a circuit intended to convert power from one type of power to another type of power, where a type of power is characterized by its voltage level (examples: 12 V dc, 115 V rms ac), and wave form (examples: dc, single phase ac, three phase ac).

Converting power: verb: Using a power converter to convert power from one type of power to another type of power.

Modulator or power modulator: noun: A modulator is a circuit for converting power from one voltage and current to another voltage and current such that the power in (voltage times current) equals the power out, and the ratio of the voltage in to the voltage out is controlled by a control input. An ideal modulator has no losses. A practical modulator has small losses.

Buck derived modulator: noun: A buck derived modulator is a power modulator characterized by having one or more input switches which may be pulse width modulated and an output inductor and capacitor. A duty cycle control input determines the duty cycle of the input switch(es). The output voltage is D times the input voltage, where D is the duty cycle. Variants of a buck derived modulator include a three input buck modulator, an ac-dc buck modulator and a three phase ac-dc buck modulator, as examples, not limitations.

Boost derived modulator: noun: A boost derived modulator is a power modulator characterized by having an input inductor followed by a boost switch that may be pulse width modulated, a boost rectifier and a capacitor. A duty cycle control input determines the duty cycle of the boost switch. The output voltage is the input voltage divided by (1−D), where D is the duty cycle. The boost derived modulator is the reciprocal of a buck derived modulator.

Variable dc-dc transformer modulator: noun: A power modulator wherein the ratio of the input voltage to the output voltage is controlled by varying the effective turns ratio of a variable dc-dc transformer. A ratio control input determines the effective turns ratio of the variable dc-dc transformer modulator. See FIG. 16.

Variable dc-dc transformer coupled buck converter: Noun: A power converter of the general type as a transformer coupled buck converter, but using a variable dc-dc transformer between the buck switches and the inductor. See FIG. 6.

Saturated: Adjective: When describing a power modulator, it is when its control input is at its extreme value and is not varying. For a buck derived modulator, the extreme value is a duty cycle of 100 percent. For a boost derived modulator, the extreme value is a duty cycle of 0 percent. For a variable dc-dc transformer modulator, the extreme value is when the effective turns ratio is at its maximum value. The significance of being saturated, for this invention, is that it is the state in which the power modulator has maximum efficiency (minimum losses).

Nearly saturated: Adjective: When describing a power modulator in this specification and the claims, it is when its control input is very nearly at its extreme value, with very little control range remaining. The significance of being nearly saturated, for this invention, is that it is a state in which the power modulator has almost is maximum efficiency (very low losses). "Nearly saturated," an indefinite term, is made definite for the purposes of this specification and the claims by defining it precisely in terms of the input voltage and the control input needed to maintain regulation at that input voltage, using the example of a variable dc-dc transformer modulator. When used in accordance with the teachings of this invention, the variable dc-dc transformer saturates at just above the upper limit of the normal range of input voltage, as an example, not a limitation, 120 V ac for a normal range of 115 V ac plus or minus 5 V ac. At the lower limit of the normal range, 110 V ac, the control of the variable dc-dc transformer will be approximately 110/120, or 92 percent of its extreme value. For this example, 92 percent saturated or greater is "nearly saturated". Appropriate adjustments are made for other "normal" ranges and for the variations in the saturation point due to component variations and design trade-offs.

Normal range: Noun: With respect to an input voltage, it is the nominal input voltage with a small range above and below the nominal input voltage within which the voltage is expected to stay during normal operation. See FIG. 2.

Over voltage range: Noun: Any voltage that is above the normal range of input voltage.

Under voltage range: Noun: Any voltage that is below the normal range of input voltage.

I claim:

1. A power converter having an input voltage and an output voltage comprising:
a buck derived power modulator in series with a variable dc-dc transformer power modulator,
the power converter having a normal mode for operation when the input voltage is in its normal range
the power converter having an over voltage mode for operation when the input voltage is above its normal range, and
the power converter having an under voltage mode for operation when the input voltage is below its normal range,
when the power converter is operating in the normal mode, the buck derived power modulator is saturated, the variable dc-dc transformer power modulator is nearly saturated and voltage regulation of the output voltage is accomplished by varying a ratio control input of the variable dc-dc transformer power modulator;
when the power converter is operating in the over voltage mode, the variable dc-dc transformer power modulator is saturated and voltage regulation of the output voltage is accomplished by varying a duty cycle control input of the buck derived power modulator, and
when the power converter is operating in the under voltage mode, the buck derived power modulator is saturated, and voltage regulation of the output voltage is accomplished by varying the ratio control input of the variable dc-dc transformer power modulator.

2. The power converter of claim 1 wherein the buck derived power modulator is a dc-dc buck converter.

3. The power converter of claim 1 wherein the buck derived power modulator is a single phase ac-dc buck converter.

4. The power converter of claim 1 wherein the buck derived power modulator is a three input buck converter.

5. The power converter of claim 1 wherein the buck derived power modulator is a three phase ac-dc buck converter.

6. A variable dc-dc transformer modulator having an input voltage and an output voltage comprising:
a variable dc-dc transformer having a plurality of transformer elements, an inductor and an output capacitor
the variable dc-dc transformer and the inductor comprising a series circuit connecting the input voltage to the output filter capacitor and the output voltage,
each one of the plurality of transformer elements having first and second synchronous rectifiers connected to first and second outputs of the respective each one of the plurality of transformer elements, and
each one of the plurality of transformer elements having a shorting switch connected across the first and second outputs of the respective each one of the plurality of transformer elements, so that
any number of the plurality of transformer elements can be effectively removed from the variable dc-dc transformer by turning off, respectively, both the first and second synchronous rectifiers of the respective transformer elements, and by turning on the respective shorting switch of the respective transformer elements, so that the ratio of the output voltage to the input voltage is controlled by the quantity of the plurality of transformer elements of the variable dc-dc transformer power modulator that are effectively removed from the variable dc-dc transformer.

7. A variable dc-dc transformer coupled buck converter having an input voltage and an output voltage comprising:

a buck derived switching means a variable dc-dc transformer, an inductor, and an output filter capacitor;

the buck derived switching means, the variable dc-dc transformer and the inductor comprising a series circuit connecting the input voltage to the output filter capacitor and the output voltage the variable dc-dc transformer coupled buck converter having a normal mode for operation when the input voltage is in its normal range the variable dc-dc transformer coupled buck converter having an over voltage mode for operation when the input voltage is above its normal range, and the variable dc-dc transformer coupled buck converter having an under voltage mode for operation when the input voltage is below its normal range, when the variable dc-dc transformer coupled buck converter is operating in the normal mode, the buck derived switching means is saturated, the variable dc-dc transformer is nearly saturated and voltage regulation of the output voltage is accomplished by varying a ratio control input of the variable dc-dc transformer;

when the variable dc-dc transformer coupled buck converter is operating in the over voltage mode, the variable dc-dc transformer is saturated and voltage regulation of the output voltage is accomplished by varying a duty cycle control input of the buck switching means, and when the variable dc-dc transformer coupled buck converter is operating in the under voltage mode, the buck derived switching means is saturated, and voltage regulation of the output voltage is accomplished by varying the ratio control input of the variable dc-dc transformer.

8. The power converter of claim 7 wherein the buck derived switching means is a dc switching circuit.

9. The power converter of claim 7 wherein the buck derived switching means is a single phase ac-dc switching circuit.

10. The power converter of claim 7 wherein the buck derived switching means is a three input switching circuit.

11. The power converter of claim 7 wherein the buck derived switching means is a three phase ac-dc switching circuit.

* * * * *